US007455412B2

(12) United States Patent
Rottcher

(10) Patent No.: US 7,455,412 B2

(45) Date of Patent: Nov. 25, 2008

(54) MIRROR HAVING A PORTION IN THE FORM OF AN INFORMATION PROVIDER

(75) Inventor: Oliver Rottcher, Gottmadingen (DE)

(73) Assignee: Mirror Image AG, Steinach (CH)

( * ) Notice: Subject to any disclaimer, the term of this patent is extended or adjusted under 35 U.S.C. 154(b) by 0 days.

(21) Appl. No.: 09/883,729

(22) Filed: Jun. 18, 2001

(65) Prior Publication Data

US 2002/0015226 A1 Feb. 7, 2002

(30) Foreign Application Priority Data

Jun. 24, 2000 (DE) ................................ 100 30 960
Feb. 2, 2001 (DE) ................................ 101 04 644

(51) Int. Cl.
*G03H 1/00* (2006.01)
*G03B 21/56* (2006.01)
*G02B 5/08* (2006.01)

(52) U.S. Cl. ........................... 359/839; 359/1; 359/460; 359/445; 40/900

(58) Field of Classification Search ................. 359/449, 359/460, 445, 443, 800–830, 35, 1, 119, 359/74, 838–839; 40/900; 345/24, 76; 348/748
See application file for complete search history.

(56) References Cited

U.S. PATENT DOCUMENTS 1,680,016 A * 8/1928 Dawley ...................... 434/395
1,849,708 A * 3/1932 Colbert et al. .............. 434/408
2,221,888 A * 11/1940 White ......................... 40/219
2,221,889 A * 11/1940 White ......................... 40/219
4,202,607 A 5/1980 Washizuka et al.
4,517,040 A 5/1985 Whitted
4,588,267 A * 5/1986 Pastore ....................... 359/636
4,630,904 A * 12/1986 Pastore ....................... 359/636
4,747,223 A * 5/1988 Borda ......................... 40/219
4,765,076 A * 8/1988 Sada ........................... 40/219
D299,491 S 1/1989 Masuda
D300,642 S * 4/1989 Pawlik et al. ................ D20/10
5,123,192 A * 6/1992 Hsieh .......................... 40/442
5,148,283 A 9/1992 Taddeo (Continued)

FOREIGN PATENT DOCUMENTS

DE 29916732 U1 * 3/2000

(Continued)

OTHER PUBLICATIONS

"Lake Las Vegas homeowners show creativity." located at http://lasvegasnewspapers.com/realestate/REMay-21-Sun-2000/Front/13554146.html: retrieved on Dec. 17, 2004 (2 pages).

(Continued)

*Primary Examiner*—Diane I. Lee
*Assistant Examiner*—Magda Cruz
(74) *Attorney, Agent, or Firm*—Morrison & Foerster LLP

(57) ABSTRACT

In a mirror with a non-reflective portion provided within its reflective mirror surface as an information provider the portion is transparent and is backed by a display. The display has a moving image or has a colored image representation. Preferably at least one loudspeaker is connected to the display behind the mirror surface. That loudspeaker can also be connected to an input device.

11 Claims, 3 Drawing Sheets

U.S. PATENT DOCUMENTS

| | | | | | |
|---|---|---|---|---|---|
| 5,210,967 | A | * | 5/1993 | Brown | 40/219 |
| 5,228,879 | A | * | 7/1993 | Fromm | 446/219 |
| 5,416,313 | A | * | 5/1995 | Larson et al. | 250/214 AL |
| 5,631,638 | A | * | 5/1997 | Kaspar et al. | 340/902 |
| 5,642,238 | A | | 6/1997 | Sala | |
| 5,887,369 | A | * | 3/1999 | Danielczak | 40/428 |
| 5,956,181 | A | | 9/1999 | Lin | |
| 5,993,006 | A | | 11/1999 | Takeuchi et al. | |
| 6,106,121 | A | * | 8/2000 | Buckley et al. | 359/839 |
| 6,152,551 | A | | 11/2000 | Annas | |
| 6,172,613 | B1 | * | 1/2001 | DeLine et al. | 340/815.4 |
| 6,200,010 | B1 | * | 3/2001 | Anders | 362/511 |
| 6,320,591 | B1 | * | 11/2001 | Griencewic | 345/582 |
| 6,477,464 | B2 | * | 11/2002 | McCarthy et al. | 701/213 |
| 6,543,163 | B1 | * | 4/2003 | Ginsberg | 40/219 |
| 6,560,027 | B2 | * | 5/2003 | Meine | 359/630 |
| 6,642,840 | B2 | * | 11/2003 | Lang et al. | 340/435 |
| 6,650,470 | B1 | * | 11/2003 | Turner et al. | 359/443 |

FOREIGN PATENT DOCUMENTS

| | | | |
|---|---|---|---|
| DE | 299 16 732 U1 | * | 5/2000 |
| EP | 0 552 768 | | 7/1993 |
| EP | 0 937 601 | | 8/1999 |
| FR | 2 586 182 | | 2/1987 |
| FR | 2 738 931 | | 3/1997 |
| GB | 2 274 733 | | 8/1994 |
| JP | 08-173285 | | 7/1996 |
| JP | 08-308700 | | 11/1996 |
| WO | WO-95/23401 | | 8/1995 |

OTHER PUBLICATIONS

German Office Action dated Aug. 28, 2007 directed to counterpart German Application No. 01 115 047.1-2214/1168285.

* cited by examiner

Fig. 1
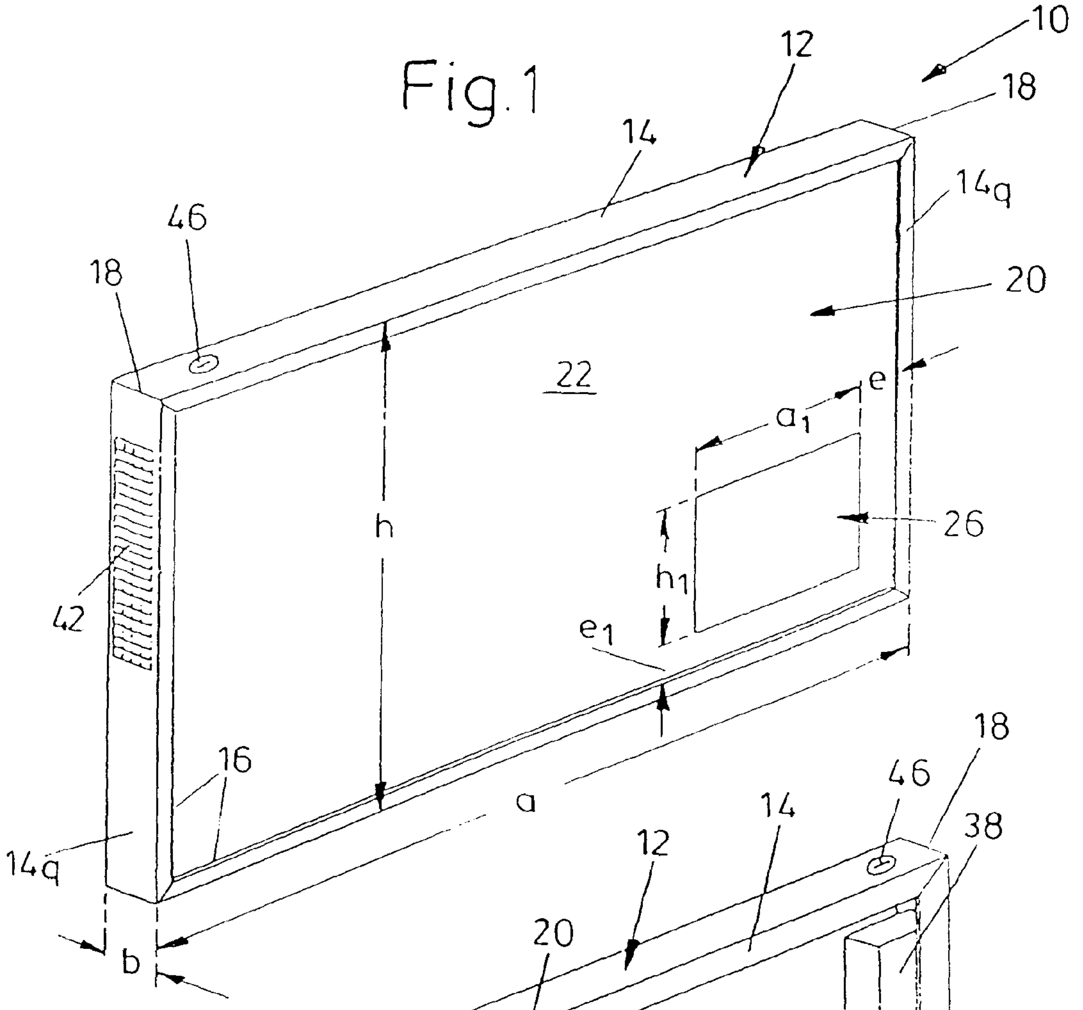
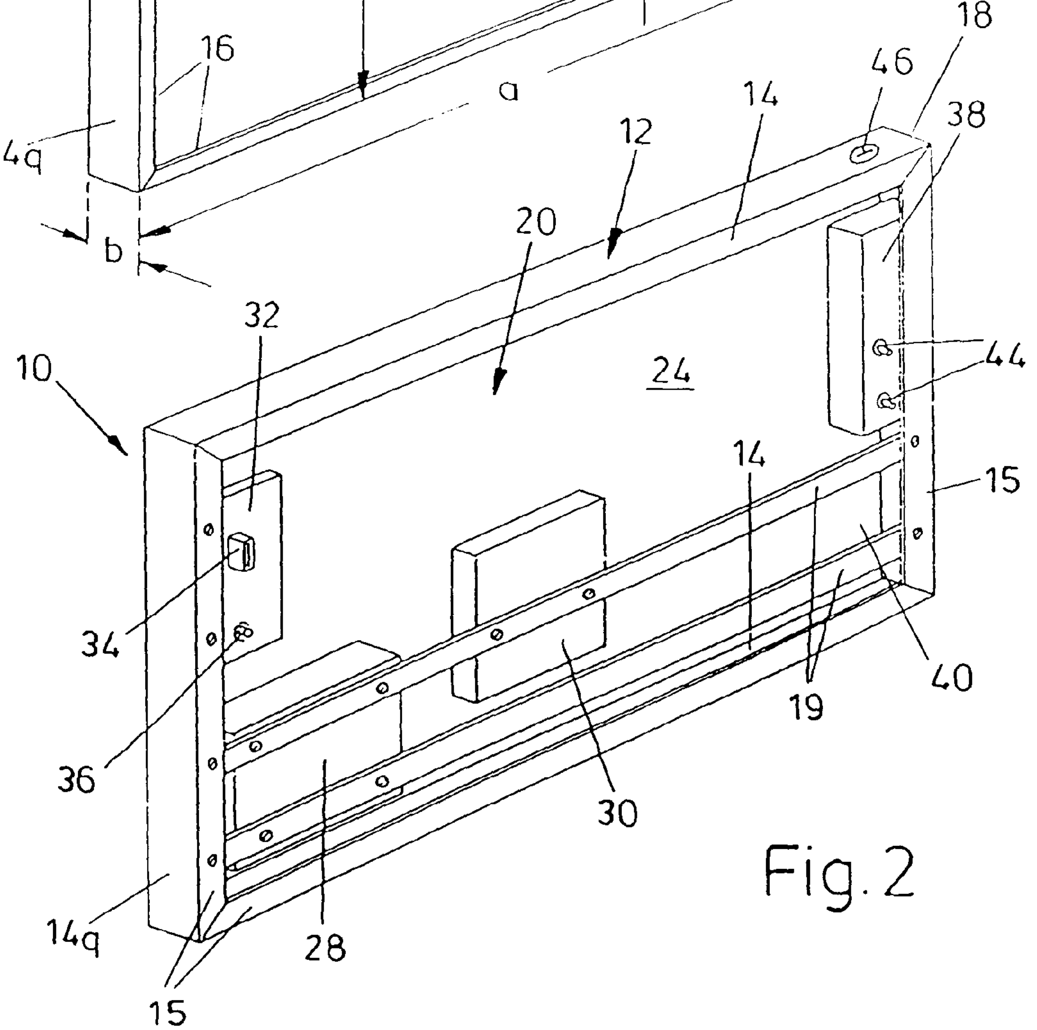
Fig. 2

MIRROR HAVING A PORTION IN THE FORM OF AN INFORMATION PROVIDER

BACKGROUND OF THE INVENTION

The present invention concerns a mirror with a non-reflective portion provided within its reflective surface, as an information provider.

DE 299 16 732 U1 depicts as state of the art an advertising mirror with a mirror layer which is semi-transparent at least in a portion thereof. In that advertising mirror in accordance with the invention at least in the portion serving as the advertising or information surface, the mirror layer is followed in the direction from the outside of the mirror towards the rear side thereof by an anti-reflection layer, an advertising layer comprising a transparent flat material, and a lighting member of a flat configuration. That arrangement suffers basically from the following problems: the communication of information is limited to a stationary image or still image which is back-lit in the form of a motif carrier to be introduced—for example a transparency—and in that way is rendered visible to the person viewing same; exchanging the individual motif carriers is complicated and difficult as, to introduce fresh motif carriers or items of information to be communicated, the mirror has to be open and the existing motif carrier has to be manually replaced by a new one.

With knowledge of that state of the art, the object of the present invention is to eliminate the recognized deficiencies and to provide a mirror which differs in regard to previously known advertising mirrors in the nature of and possible variations in the items of graphic information to be communicated, and which permits ease of handling when introducing and changing the items of information or the motif carriers.

SUMMARY OF THE INVENTION

The foregoing object is attained by providing a mirror with a non-reflective portion provided within its reflective surface as an information provider, wherein at least a portion of the mirror surface is transparent for seeing therethrough and is backed by a display.

In accordance with the invention the portion of the mirror surface, which is in the form of the information provider, is as clear as glass, that is to say completely transparent for seeing therethrough, and is backed with a display, an image viewer for optically effectively presenting objects. In particular that display should be capable of presenting a moving image. Two or more portions of that kind may also be provided in the mirror surface.

The semi-transparent mirror layer known from the state of the art is therefore the subject of development in that a moving image—preferably a colored image—is now produced within the actual mirror surface in that portion.

In accordance with the invention, a moving colored image is used for communicating information by virtue of that color display. In order to keep the thickness of the mirror as small as possible, in accordance with the invention a flat image display or flat screen is to be used. It has also proven to be advantageous to use a display of thin film transistor (TFT) or plasma technology type, but also it is possible to use other technologies for motif representation purposes, such as for example holograms for three-dimensional image representation. In particular it is also possible to use a display involving touch screen technology which makes it possible to call up various functions and program procedures on the display and also the representation of different kinds of images such as for example television pictures, computer images and animation, an Internet surface and a multi-media surface, in the display or information surface provided for that purpose.

The inventor also proposes the communication of audio elements; the incorporation of at least one loudspeaker—preferably connected to the display or another peripheral device for operation of the display such as for example a PC, video recorder or DVD-player—makes it possible to communicate audio elements such as for example music, a speech backing or the like. The audio elements can be reproduced both alone and also—preferably—in conjunction with the image information.

The form of feeding in information is to be considerably facilitated for the purposes of greater ease of handling, and it is to be ensured that the mirror does not have to be opened nor does a person have to be physically present in order to input data or fresh motifs into the information mirror. For that purpose, the installed display and the loudspeakers are supplied with the items of information to be represented from a suitable peripheral device—once again a computer, video recorder, DVD-player, CD-player or the like. In order to change the items of information to be communicated, it is just the inserted reproduction medium that is changed, that is to say for example the video cassette of the video recorder.

In general, a computer is used for operation of the display and the loudspeakers, in which case the items of information and data to be represented can be transferred onto that computer from another computer by data transfer—for example integrated services digital_network (ISDN) data transmission or other transmission options.

The foregoing features mean that opening of the mirror is now no longer necessary when changing the information or the motif, so that it becomes possible for the mirror to be fixedly installed at suitable locations. The change in motif can also be effected in the absence of an operator.

In accordance with the invention, break-proof glass can preferably be used for the mirror, and volume control for the loudspeaker or loudspeakers can also be effected by means of remote control—for example infra-red control. In addition it has proven to be desirable to install a radio receiver module for the graphic data or to mount the described loudspeakers outside the mirror and connect them to the display or input unit.

That therefore affords a communication mirror of variable size of a very flat frame structure, in which changing or replacing the items of information is readily possible by virtue of a change in data carrier in the input device.

BRIEF DESCRIPTION OF THE DRAWINGS

Further advantages, features and details of the invention will be apparent from the description hereinafter of preferred embodiments and with reference to the drawing in which:

FIG. 1 shows a perspective view of a framed mirror,

FIG. 2 shows a perspective view of the rear side of the mirror after removal of a rear wall.

DETAILED DESCRIPTION

Figures 3, 4:
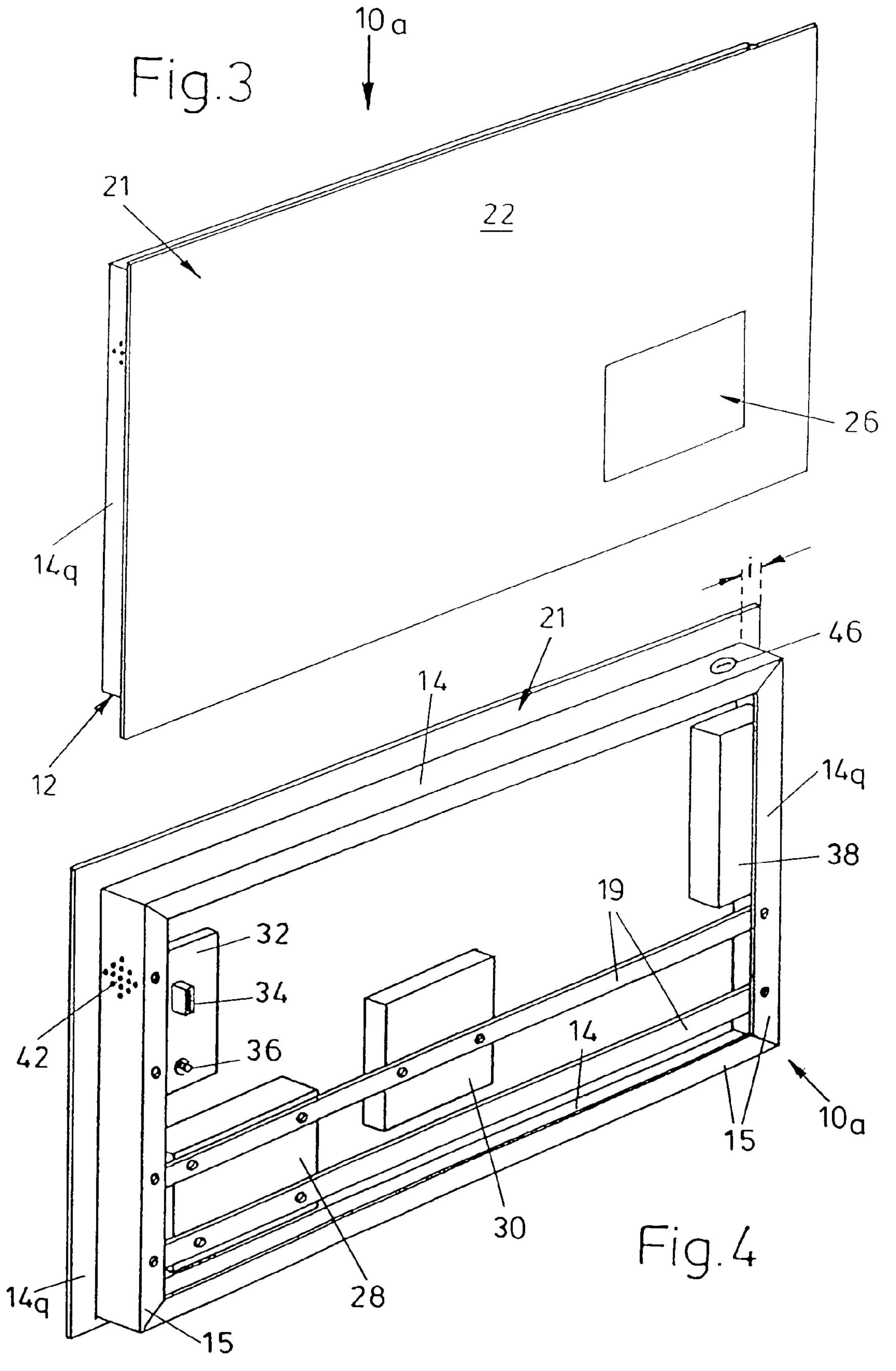
FIGS. 3 and 4 show views corresponding to FIG. 1 and FIG. 2 respectively in relation to a frame-less configuration of the mirror.

A wall mirror 10 of a length a for example of about 140 cm and a height h of 80 cm has a frame 12 of metal or plastic material—possibly also of wood—of a width b of between about 3 and 5 cm.

The frame 12 is composed to two channel-shaped longitudinal profile members 14 and two shorter transverse profile members 14$_q$ of identical cross-section—forming mitered corners 18; the rearward limb portions 15 of the frame profile members 14, 14$_q$ define a mounting plane for a rear wall (not shown in the drawing), while the front limbs 16 of the frame members form a frame-shaped abutment for a mirror insert 20 which is held within same in the frame 12.

Provided in the mirror surface 22 of the mirror insert 20 at spacings e, $e_1$ in relation to the adjacent limbs 16 of the profile members is an area 26 through which it is possible to see—having been left free for example upon chemical deposition of a backing or silver layer 24—, the length $a_1$ of the area 26 being in this case about 30 cm and its height $h_1$ being about 24 cm, while associated therewith at the rear thereof is an electronic color display 28; the latter is screwed to transverse struts 19 of the frame 12 which in turn are fixed at their ends to the rearward limb portions 15 of the profile members. Provided beside the color display 28 in FIG. 2 is a cooling device 30—for example a cooling fan—which is also mounted to the transverse struts 19.

Figure 5:
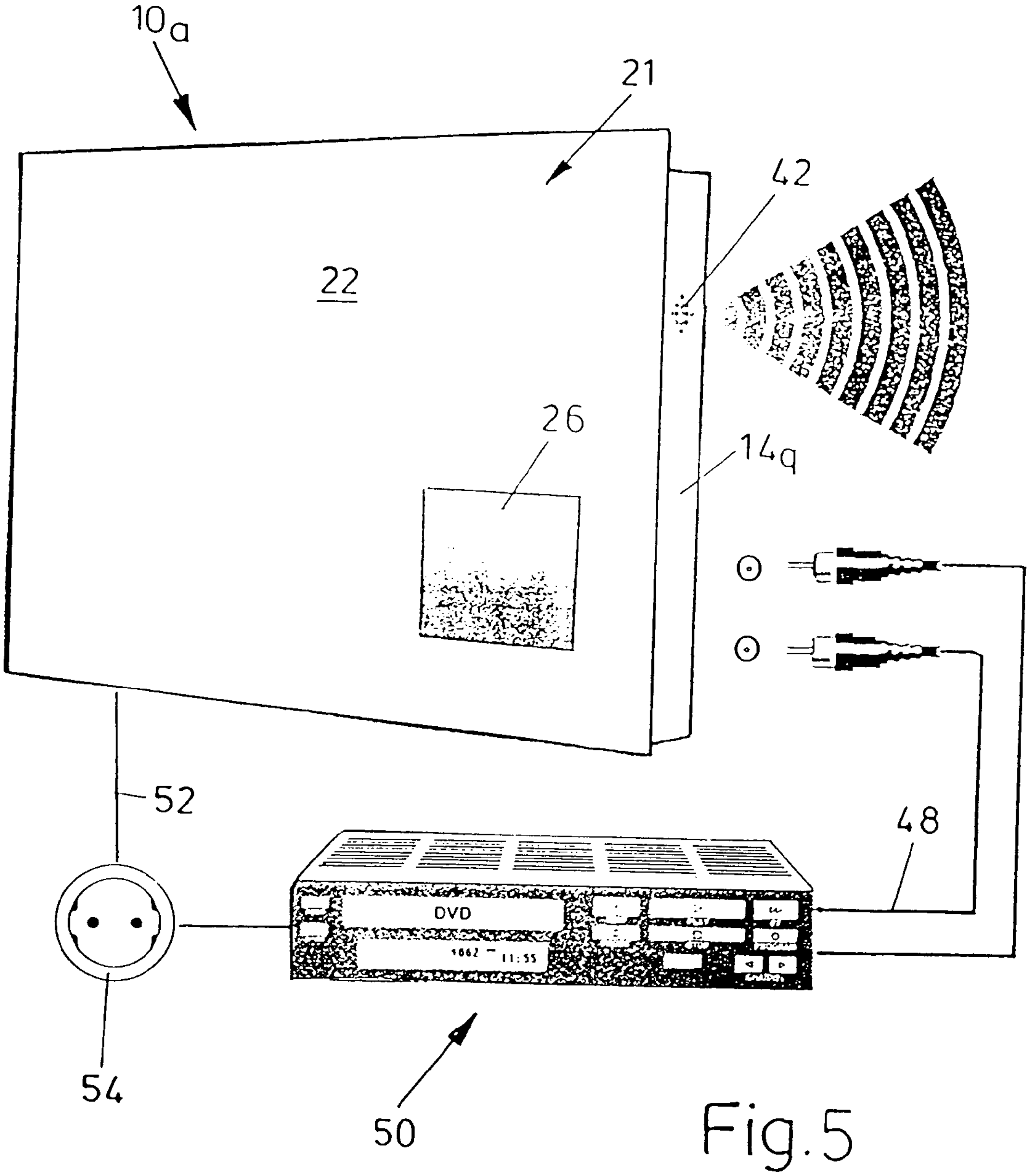
FIG. 5 shows a perspective view of the front of a mirror with additional devices.

Indicated at 32 above the display 28 is a control board which permits actuation of the display 28 with an external input device 50 which is shown in FIG. 5, such as a computer, video, DVD, CD or the like. Projecting from the control board 32 are a cable connecting plug 34 for a cable 48—for example a cinch connecting cable—of the input device 50 and a mains network connecting plug 36 for the power supply for the color display 28 and the cooling device 30 by way of the connecting cable 37 of a power source 54.

The control board 32 is mounted to the transverse profile member 14$_q$ which is adjacent thereto, and disposed opposite it on the other transverse profile member 14$_q$ of the frame 12 in the interior 40 of the mirror is a loudspeaker 38 which fits closely against a region 42 of the frame 12—which region 42 is perforated or provided with a slot or aperture insert—and the loudspeaker is provided with connection elements 44 for external devices. The interior 40 of the mirror is closed to prevent unauthorized access by a rear wall (which as mentioned is not shown in the drawing) comprising a metal, wood or plastic plate or panel, and it can be opened by actuating a cylinder lock 46 of the frame 12.

In the embodiment of the mirror 10$_a$ in FIGS. 3 and 4 the area of the mirror insert 20 is larger than the frame 12 in front of which the mirror insert 20 is fitted; the latter projects beyond the edges of the frame 12 on all sides by a distance i. In this embodiment the mirror surface 22 is part of a mirror attachment 21 and the same is fitted onto a frame 12 to form a mirror interior 40.

In accordance with the invention the multi-media mirror can also be integrated into items of furniture, bars and counters, mirror-bearing cupboards or cabinets or the like.

The invention claimed is:

1. A wall mirror with a non-reflective portion provided within a reflective surface of the mirror as an information provider, and a frame having a flat frame structure, wherein at least a portion of the mirror surface is clear as glass or totally transparent and is backed by a flat screen or a color display, the flat screen or the display being provided with a moving image, the flat screen or the display being attached to the frame, and wherein the mirror surface is part of a mirror insert which is associated with the frame to form a closed mirror interior, or the mirror surface is part of a mirror attachment which is fitted onto the frame to form a closed mirror interior.

2. The mirror according to claim 1 wherein the flat screen or the display employs TFT or plasma or hologram technologies.

3. The mirror according to claim 1 wherein behind the mirror surface at least one loudspeaker is connected to the flat screen or the display.

4. The mirror according to claim 3 wherein the loudspeaker is associated with a perforated region of the frame.

5. The mirror according to claim 1 wherein behind the mirror surface at least one loudspeaker is connected to an input device.

6. The mirror according to claim 1 wherein the flat screen or the display is connected to an input device.

7. The mirror according to claim 6 wherein the input device is optionally an external input device.

8. The mirror according to claim 1 wherein the flat screen or the display is secured to strut means which are associated with the frame.

9. The mirror according to claim 1 further with a radio receiver module for the moving image.

10. The mirror according to claim 1 further with an integrated remote operating means for volume control.

11. The mirror according to claim 10 wherein the integrated remote operating means is an infrared operating means.

* * * * *